US010829221B2

(12) United States Patent
    Pence

(10) Patent No.: US 10,829,221 B2
(45) Date of Patent: Nov. 10, 2020

(54) HEIGHT ADJUSTABLE TRAY TABLE

(71) Applicant: B/E Aerospace, Inc., Winston-Salem, NC (US)

(72) Inventor: Tracy N. Pence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 48 days.

(21) Appl. No.: 16/178,710

(22) Filed: Nov. 2, 2018

(65) Prior Publication Data

US 2020/0140091 A1    May 7, 2020

(51) Int. Cl.
*A47B 1/10* (2006.01)
*B64D 11/06* (2006.01)
*A47B 5/00* (2006.01)
*A47B 5/04* (2006.01)
*A47B 21/03* (2006.01)

(52) U.S. Cl.
CPC ............ *B64D 11/0638* (2014.12); *A47B 1/10* (2013.01); *A47B 5/006* (2013.01); *A47B 5/04* (2013.01); *A47B 21/03* (2013.01); *A47B 21/0314* (2013.01); *A47B 2021/0321* (2013.01); *A47B 2021/0335* (2013.01); *A47B 2200/0035* (2013.01)

(58) Field of Classification Search
CPC ....... B64D 11/0638; A47B 1/10; A47B 5/006; A47B 21/03; A47B 21/0314; A47B 2021/0321; A47B 2021/0335; A47B 2021/0357; A47B 2021/035
USPC .................................................. 297/146, 147
See application file for complete search history.

(56) References Cited

U.S. PATENT DOCUMENTS

| | | | | |
|---|---|---|---|---|
| 4,550,666 A * | 11/1985 | Svoboda | .................. | A47B 9/04 108/145 |
| 4,644,875 A * | 2/1987 | Watt | .................... | A47B 21/0314 108/138 |
| 5,037,054 A * | 8/1991 | McConnell | ........ | A47B 21/0314 248/284.1 |
| 5,092,652 A * | 3/1992 | Macaluso | .............. | A47B 13/16 108/26 |
| 5,211,367 A * | 5/1993 | Musculus | .......... | A47B 21/0314 248/279.1 |
| 5,257,767 A * | 11/1993 | McConnell | ........ | A47B 21/0314 248/284.1 |
| 5,490,466 A * | 2/1996 | Diffrient | ............ | A47B 21/0314 108/96 |
| 5,707,034 A * | 1/1998 | Cotterill | ............. | A47B 21/0314 108/5 |

(Continued)

*Primary Examiner* — Syed A Islam
(74) *Attorney, Agent, or Firm* — Suiter Swantz pc llo

(57) ABSTRACT

A tray table assembly and aircraft passenger seat arrangement including the same, the tray table assembly including a rail, along which a carriage slides, disposed within an alcove, from which a tray table can be deployed via a link connecting the tray table to the carriage. The link provides both the connection between the tray table and carriage for positioning the tray table horizontally along the rail and the pivotable connections between the tray table, link, and carriage for adjusting the tray table vertically, perpendicular to the rail path. Thus, the tray table assembly may be hidden in the alcove in a stowed position, partially deployed with the tray table vertically offset from the carriage, fully deployed with the tray table outside of the alcove, and any position in between.

12 Claims, 13 Drawing Sheets

(56) References Cited

U.S. PATENT DOCUMENTS

| | | | | |
|---|---|---|---|---|
| 5,924,664 | A * | 7/1999 | Mileos | A47B 21/0314 |
| | | | | 108/138 |
| 5,924,666 | A * | 7/1999 | Liu | A47B 21/0314 |
| | | | | 248/278.1 |
| 6,971,624 | B2 * | 12/2005 | Kollar | A47B 21/0314 |
| | | | | 108/137 |
| 7,188,813 | B2 * | 3/2007 | Kollar | A47B 21/0314 |
| | | | | 248/279.1 |
| 7,455,270 | B2 * | 11/2008 | Maloney | A47B 21/0314 |
| | | | | 248/278.1 |
| 7,566,039 | B2 * | 7/2009 | Hung | A47B 21/0314 |
| | | | | 248/278.1 |
| 7,946,551 | B1 * | 5/2011 | Cvek | A47B 21/0371 |
| | | | | 248/291.1 |
| 8,667,904 | B2 * | 3/2014 | Pajic | B60N 3/004 |
| | | | | 108/44 |
| 9,796,344 | B2 * | 10/2017 | Pajic | B60N 3/002 |
| 9,840,331 | B2 * | 12/2017 | Druckman | B64D 11/0638 |
| 10,363,854 | B2 * | 7/2019 | Lamb | F16M 11/041 |
| 10,538,333 | B1 * | 1/2020 | Pinger | B64D 11/0627 |
| 2015/0061327 | A1 * | 3/2015 | Millan | B60N 3/004 |
| | | | | 297/163 |
| 2017/0135468 | A1 * | 5/2017 | Johnson | A47B 23/02 |

\* cited by examiner

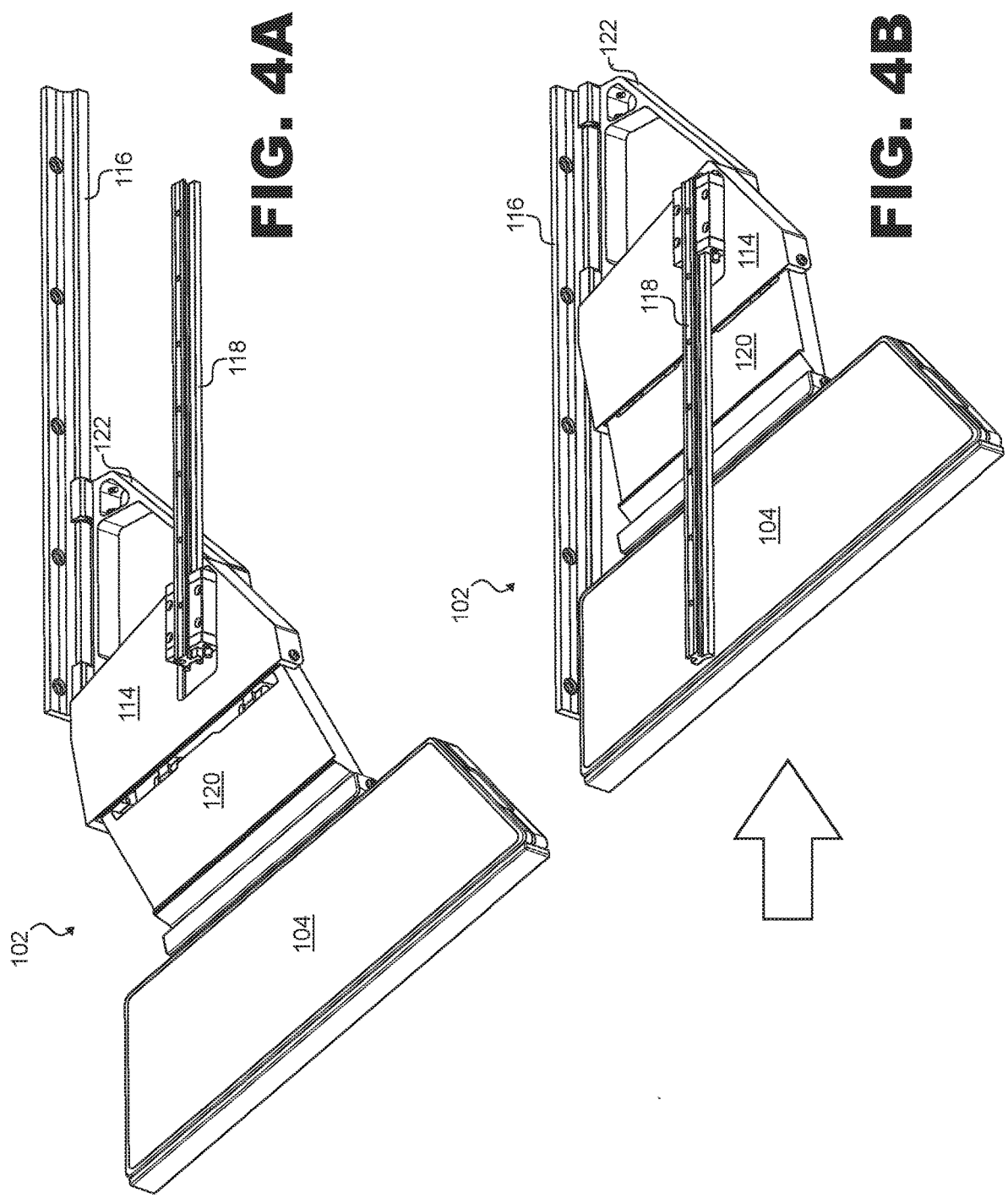

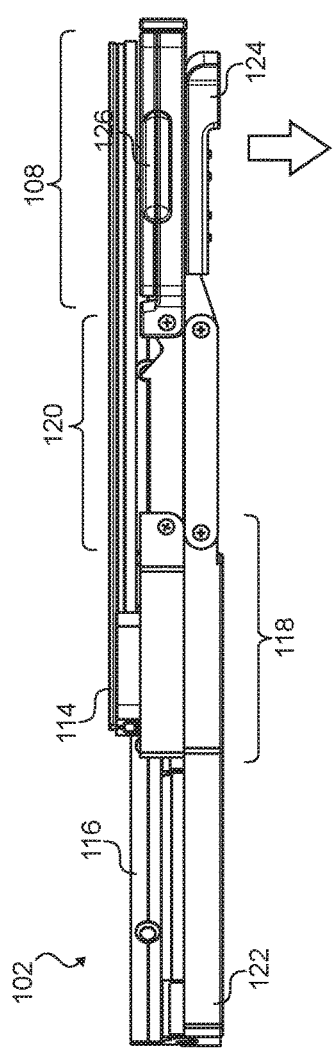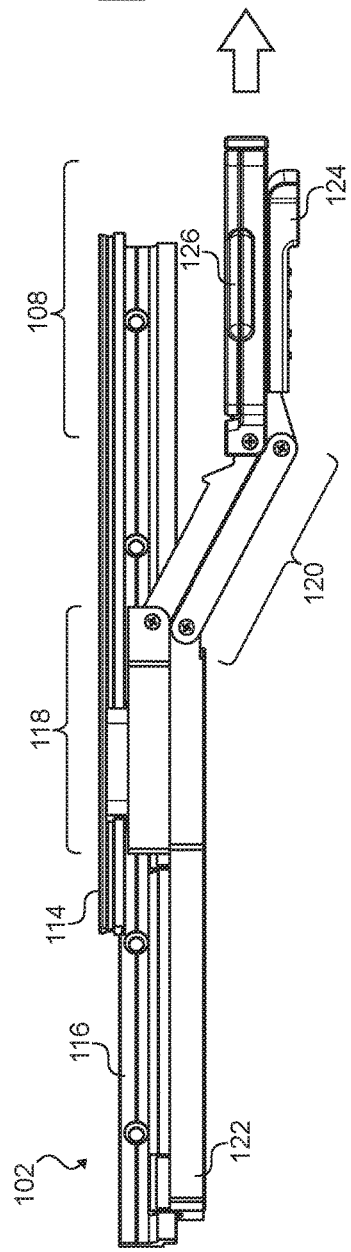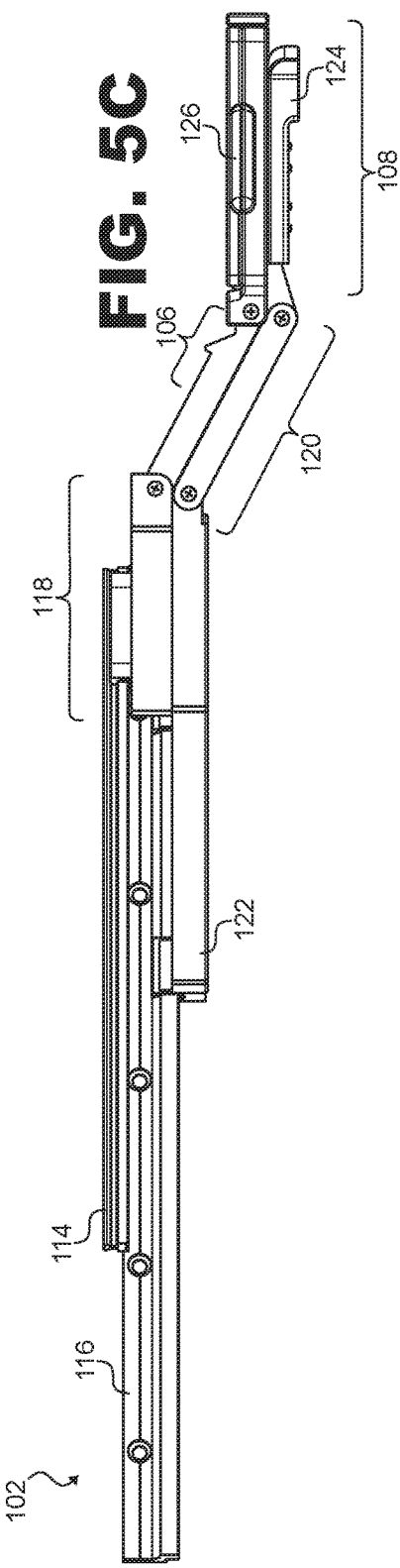

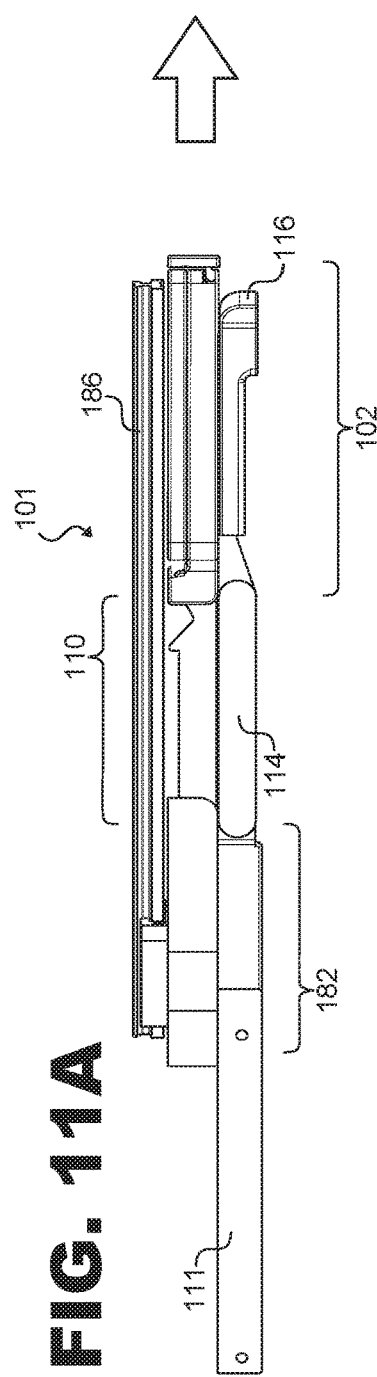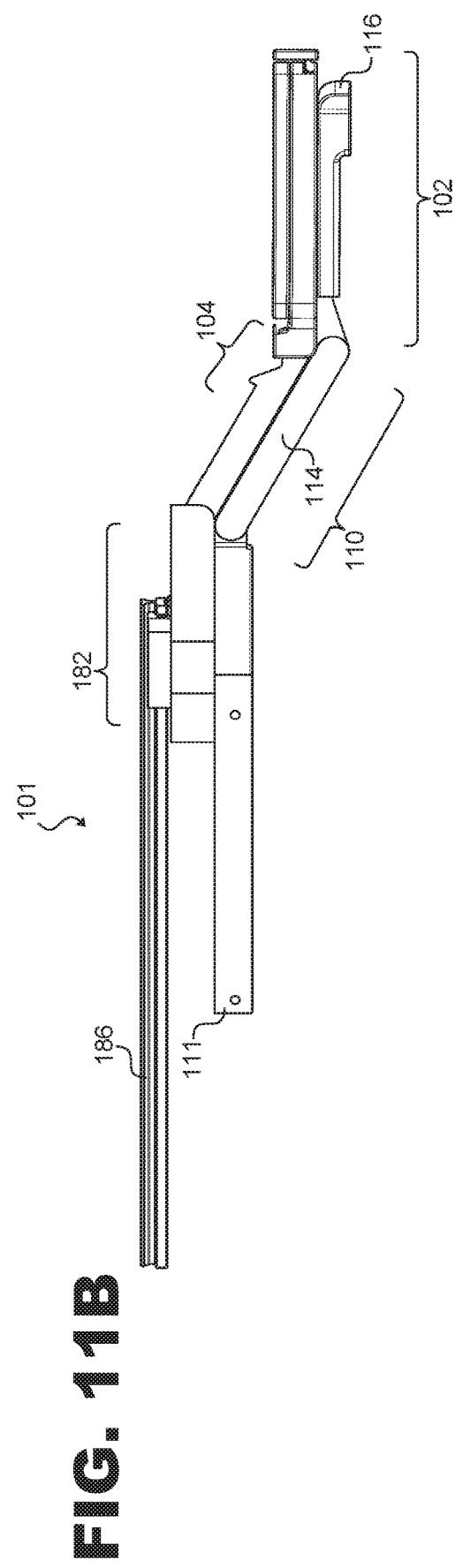

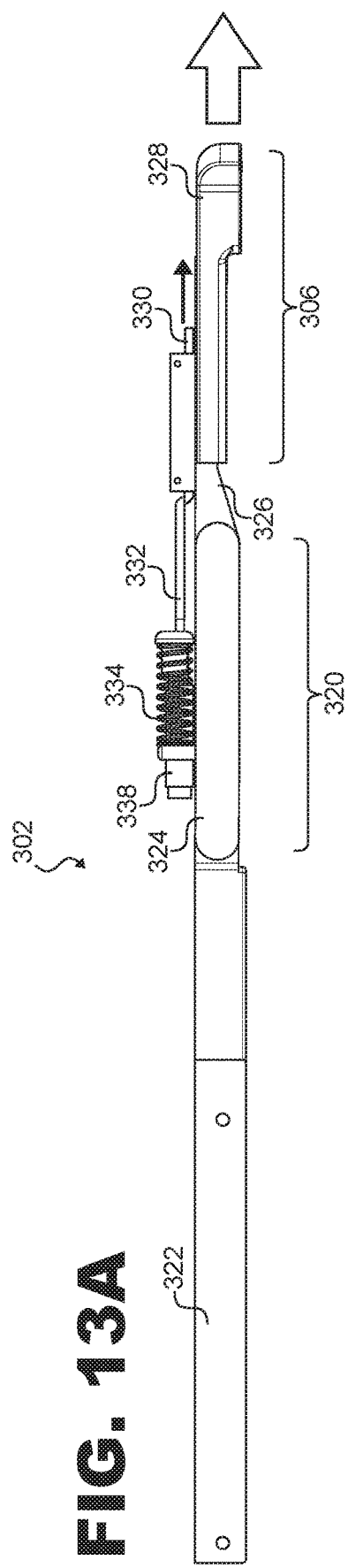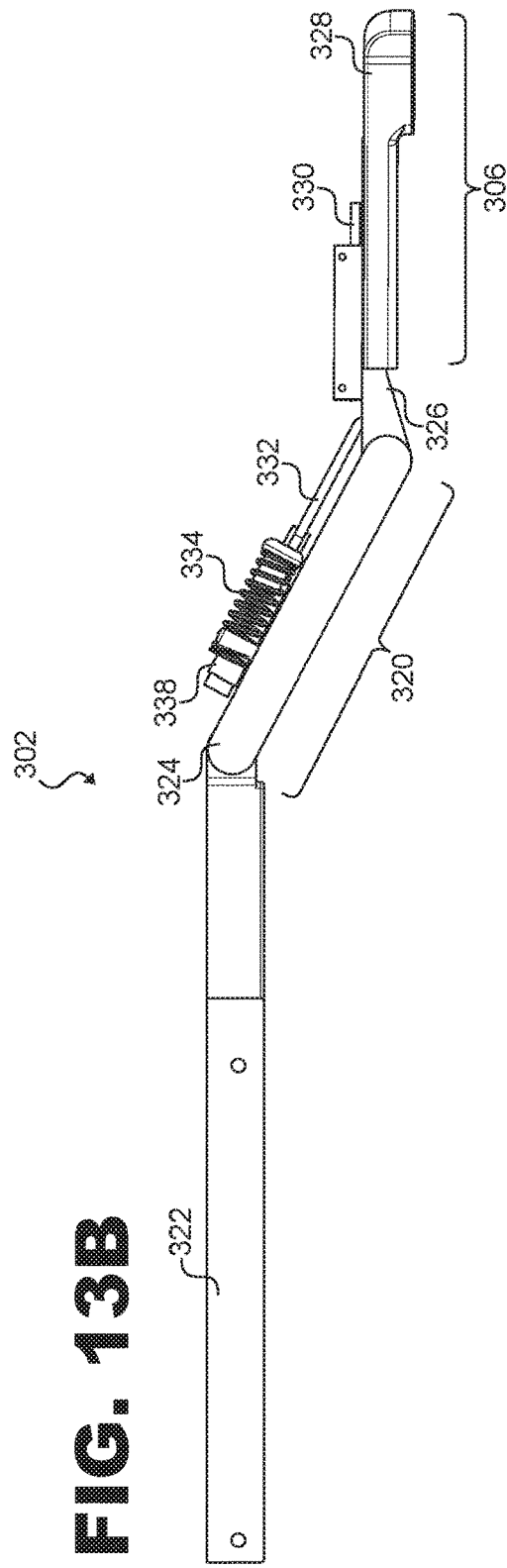

HEIGHT ADJUSTABLE TRAY TABLE

BACKGROUND

Passengers regularly consume food and beverages and interact with devices or other items while traveling on aircraft and other conveyances. Food and beverages, personal electronic devices, and other items may be supplied by a carrier or may be brought on board by passengers. Either way, passengers require a place to secure the consumables, devices, and/or other items to avoid the inconvenience of having to continuously hold these items.

With respect to passenger aircraft, tray tables can be utilized to secure food and beverages, personal electronic devices, and other items during flight. Tray tables typically include a tabletop configured to transition between a stowed position during taxi, take-off and landing, and a deployed position during flight, oftentimes changing tabletop orientation between the two positions. For example, tray tables may deploy from against the backside of a forward backrest. In another example, tray tables may deploy from alongside a passenger seat. While the former are typically utilized with economy and premium economy class passenger seats in second and subsequent rows, the latter are typically utilized in premium seating classes and the first row of each seating class.

What is desirable is a deployable tray table that can be hidden from view when stowed out of the way for improved aesthetics and that allows passengers to independently adjust both the height of the tray table when fully deployed and the distance between the tray table and the passenger without requiring a secondary slide mechanism. This independent operability of the height and distance adjustments provides more flexibility and easier integration of the tray table into a variety of seats with differing pitches, distances, heights, etc. Such a deployable tray table would be particularly well-suited for use with premium class aircraft passenger seats.

BRIEF SUMMARY

In one aspect, embodiments of the inventive concepts disclosed herein are directed to a tray table assembly including a rail adapted to be affixed to a monument, a carriage slidably engaging the rail, a link pivotably coupled to the carriage at a first end of the link, and a table hingedly connected to the link at a second end of the link opposite the first end of the link, wherein the table is couple to a handle for sliding the carriage along the rail. The table may be configured to deploy from a stowed position, in which the table is directly below and adjacent the rail and coplanar with the carriage, to an unlatched position, in which the table is below and apart from the rail and at a lower elevation than the carriage, to a first use position, in which the table is forward of the rail and at a lower elevation than the carriage, and to a second use position, in which the table is forward of the rail and coplanar with the carriage.

In another aspect, the tray table assembly may further include a second rail adapted to be affixed to the monument, and a stabilizer coupled to the carriage and slidably engaging the second rail.

In a further aspect, the link may comprise an integral backrest adapted to position a personal electronic device supported thereon at a predetermined angle.

In a further aspect, the table may be a bifold table comprising first and second pivotably connected portions.

In a further aspect, the handle may comprise a latching mechanism, that when latched, prevents the tray table assembly from deploying out of the stowed position.

In a further aspect, the table may comprise an integrated side handle.

In another aspect, embodiments of the inventive concepts disclosed herein are directed to an aircraft passenger seat arrangement including a passenger seat, an alcove positioned directly forward of the passenger seat and covered by a static structure, and a tray table assembly disposed within the alcove and affixed to the static structure. The tray table assembly may include a rail affixed to an underside of the static structure, a carriage slidably engaging the rail, a link pivotably coupled to the carriage at a first end of the link distal from the passenger seat, and a table hingedly connected to a second end of the link proximate the seat, wherein the table is coupled to a handle for sliding the carriage along the rail. The table may be configured to deploy from a stowed position, in which the table is directly below and adjacent the rail and coplanar with the carriage, to an unlatched position, in which the table is below and apart from the rail and at a lower elevation than the carriage, to a first use position, in which the table is forward of the rail and at a lower elevation than the carriage, and to a second use position, in which the table is forward of the rail and coplanar with the carriage.

In another aspect, the tray table assembly may further include a second rail affixed to the static structure, and a stabilizer coupled to the carriage and slidably engaging the second rail.

In a further aspect, the link of the tray table assembly may include an integral backrest adapted to position a personal electronic device supported thereon at a predetermined angle.

In a further aspect, the table may be a bifold table comprising first and second pivotably connected portions.

In a further aspect, the handle may include a latching mechanism, that when latched, prevents the tray table assembly from deploying out of the stowed position.

In a further aspect, the table may include an integrated side handle.

In another aspect, embodiments of the inventive concepts disclosed herein are directed to a tray table assembly including a rail adapted to be affixed to an underside of a static structure, a carriage slidably engaging the rail, a link pivotably coupled to the carriage at a first end of the link, and a table hingedly connected to the link at a second end of the link opposite the first end of the link. The table may be configured to deploy from a stowed position, in which the table is directly below and adjacent the rail and coplanar with the carriage, to an unlatched position, in which the table is below and apart from the rail and at a lower elevation than the carriage, to a first use position, in which the table is forward of the rail and at a lower elevation than the carriage, and to a second use position, in which the table is forward of the rail and coplanar with the carriage.

In a further aspect, the table may include an actuator operable to release the table from the stowed position when actuated.

In a further aspect, the actuator may be a handle coupled to the table.

In a further aspect, the actuator may be operable for repositioning a brace biased to rest in between the table and the link such that the brace prevents relative rotation around the hinged connection between the table and the link.

In a further aspect, the actuator may be operable for releasing the table assembly from the second use position.

In a further aspect, the table may cooperate with the link by way of a friction hinge while in the first use position.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature or function. In the drawings:

FIGS. 4A-B are perspective views of the tray table assembly of FIGS. 1-3 shown in a deployed position and in a stowed position, respectively;

FIGS. 5A-C are side elevational views of the tray table assembly of FIGS. 1-4B shown in a fully stowed position, a partially deployed unlatched position, and a fully deployed position, respectively;

FIGS. 11A-B are side elevational views of the tray table assembly of FIGS. 6-10 as the tray table assembly slides selectively along the upper mounting rail and the tabletop portion adjustably changes height, respectively;

FIGS. 13A-B are side elevational views of the lower portion of the tray table assembly of FIG. 12 shown in latched and unlatched positions, respectively.

DETAILED DESCRIPTION OF EXEMPLARY EMBODIMENTS

Figure 1:
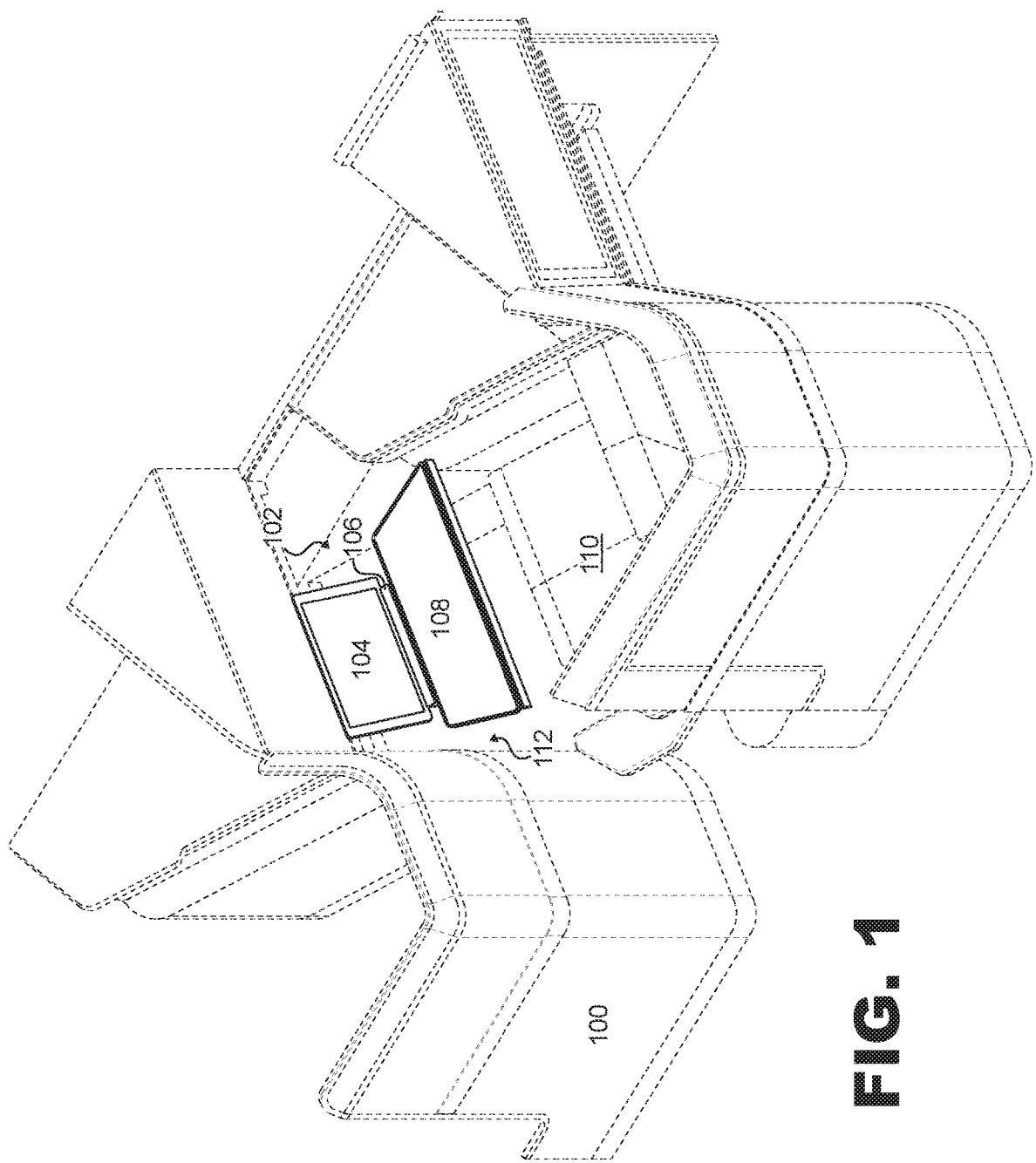
FIG. 1 is a perspective view of a non-limiting example of a tray table assembly within an environment of a premium class aircraft passenger seat, in accordance with embodiments of the present disclosure.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are generally directed to tray table assemblies mountable under premium class aircraft passenger seating monuments or other structures. The tray table assembly is retained in place under the structure such that a handle portion of the tray table assembly is disposed within reach of a seated user (e.g., about arms length near the top of a covered space or alcove), such that the tray table assembly when not being used does interfere with use of the space in the covered alcove or between the alcove and the seated user. When not deployed or in-use, the tray table assembly may be hidden from view in a stowed position and aesthetically integrated into the clean lines of the designed space, rather than conspicuously obtruding in a bulky or disjointed manner. The tray table assembly may be easily deployed from the stowed position and adjusted in multiple dimensions. The tray table assembly may be mounted directly or indirectly to the sides and/or undersurfaces of a structure via a mounting rail, which further cooperates with a sliding bracket connected to and/or integrated with a carriage of the tray table assembly to provide selective positioning along the path of the rail. Additionally, the tray table assembly may include a link between the carriage and table portion that operates to allow the user to freely adjust the height and/or elevation of the table portion relative to the carriage, rail, and structure, to which the tray table assembly is mounted. Thus, the user may enjoy dual variable customization of the orientation for the convenient tray table assembly, which can be used, for example, as a working surface, storage space, fixture for devices, etc.

In addition to the user benefits derived from the adaptable tray table assembly, the modifiable features of the disclosed tray table assemblies facilitate installation into many different structures or monuments, regardless of the seating dimensions. Accordingly, the tray table assemblies of the present disclosure may be mass-produced as modular fittings for any type of structure, monument, seating arrangement, table, desk, alcove, surface, interface, furniture, etc.

Further, the tray table assembly may be equipped with various tray features on the table portion, including assorted inserts, shapes, sizes, and configurations, which are readily interchangeable for holding different items, for example, beverage containers, portable electronic devices, etc. The table portion, accessories, and other tray table assembly components may be made from durable lightweight materials including, but not limited to, plastics and aluminum. The table portion itself may be a bi-folding assembly with different surface treatments and/or sculpted receptacles on one side for use with specific devices, consumables, or other items, and a flat and durable surface on the other side for adapting to many kinds of tasks.

Referring to FIG. 1, a non-limiting example of a premium class aircraft passenger seating arrangement is shown generally at reference numeral 100 in dashed lines, as one of many possible exemplary environments for a tray table assembly 102. The tray table assembly 102 is shown deployed with a personal electronic device 104 propped up on an integrated device backrest 106 connected to a table portion 108 of the tray table assembly 102. The tray table assembly 102 is installed within the premium class aircraft passenger seating arrangement 100 such that a passenger sitting in a passenger seat 110 may position the table portion 108 of the tray table assembly 102 closer to or farther away from themselves along a rail, on which the tray table assembly 102 glides. Additionally, because of the pivotable couplings between the table portion 108, a link portion (atop which the personal electronic device 104 is resting), and a carriage portion (which glides along the rail) of the tray table assembly 102, the passenger may position the table portion 108 of the tray table assembly 102 up or down relative to the seat 110 or their lap. Finally, when the passenger no longer wants or needs use of the table portion 108 of the tray table assembly 102, the tray table assembly 102 stows away underneath the rail completely within the footwell or alcove 112 of the premium class aircraft passenger seating arrangement 100.

Figure 2:
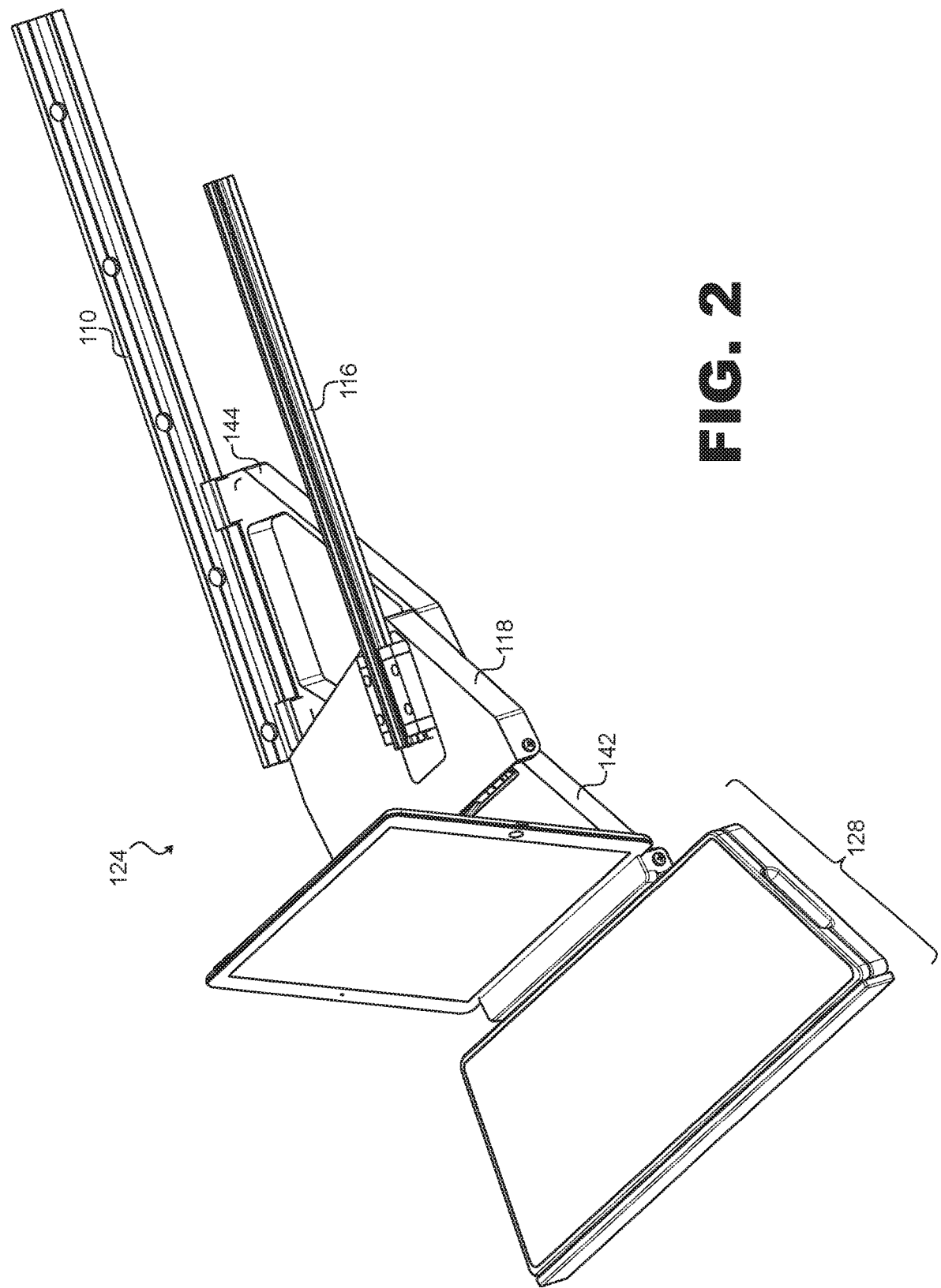
FIG. 2 is an isometric view of the tray table assembly of FIG. 1 shown including rails and isolated from the aircraft passenger seat environment.

FIG. 2 shows the tray table assembly 102 of FIG. 1 including a first rail 114 and a second rail 116 and isolated from the environment of a premium class aircraft passenger seating arrangement. The first rail 114 and the second rail 116 may connect the tray table assembly 102 to the inner surfaces of an alcove or any other fixed structure. A carriage 118 of the tray table assembly 102 interconnects the link 120 and the table portion 108 back to the first rail 114. The tray table assembly 102 may include a stabilizer 122 that connects the carriage 118 to the second rail 114. As shown, the first rail 114 may be affixed to an overhanging or undersurface of a fixed structure, and the second rail 116 may be affixed to a side surface of a fixed structure. Other variations of the configuration of the rails are possible, including but not limited to, two or more rails configured to be affixed to an undersurface and/or two or more rails configured to be affixed to opposing side surfaces of a fixed structure. The relative shape configuration of the link 120, carriage 118, and stabilizer 122 may resemble a narrowing wedge as shown in FIG. 2. This advantageously allows for unique and/or tight fits in smaller alcoves, especially where space is at a premium.

Figure 3:
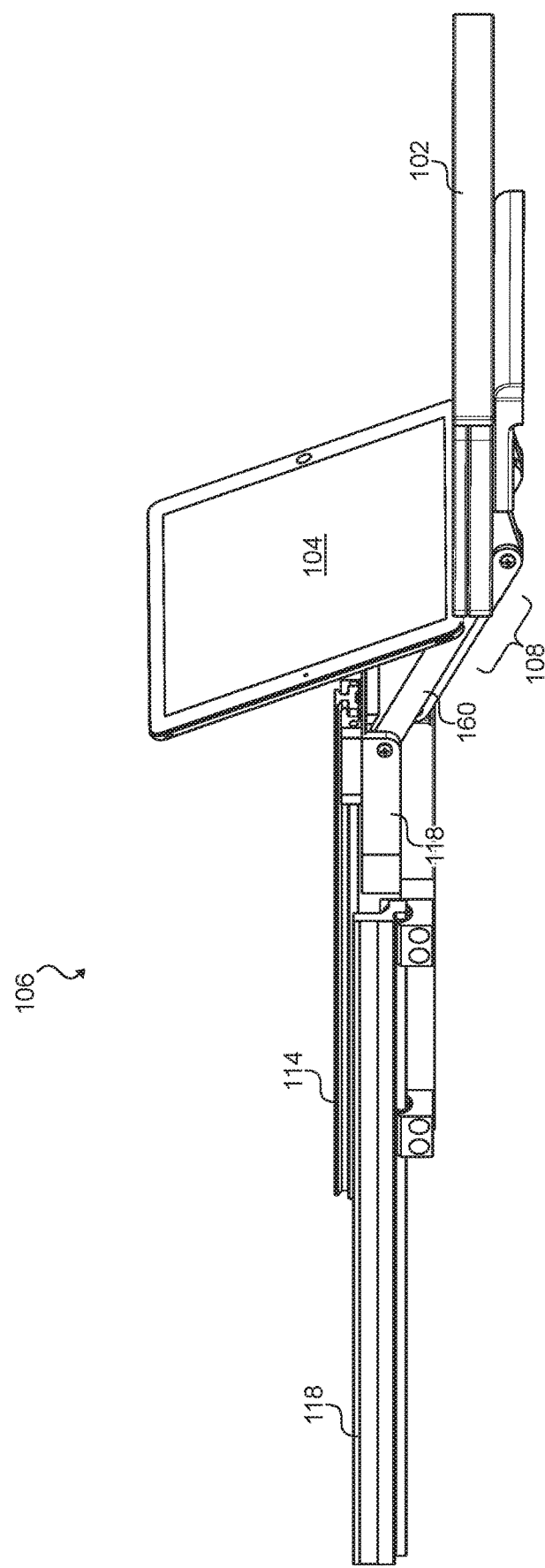
FIG. 3 is side elevational view of the tray table assembly of FIGS. 1-2 shown with a personal electronic device propped up on an integrated backrest.

FIG. 3 shows a side view of the tray table assembly 102 of FIGS. 1-2 with the personal electronic device 104 propped up on the integrated device backrest 106. From this view, the table portion 108 may be seen vertically offset from the carriage 118 via the link 120 of the tray table assembly 102 partially deployed in a first use position.

FIG. 4A shows a perspective view of the tray table assembly 102 of FIGS. 1-3 partially deployed in the first use position, while FIG. 4B shows a perspective view of the tray table assembly 102 of FIGS. 1-4A after returned slid back along the first rail 114 and second rail 116 into a stowed position, hidden from view with the carriage 118, link 120, and table portion 108 all directly adjacent and below the first rail 114. In the stowed position, the carriage 118, link 120, and table portion 108 may be coplanar such that the space under the tray table assembly 102 is maximized and the tray table assembly 102 is hidden and stowed conveniently out of the way under any fixed structure to which the tray table assembly 102 may be attached. Pivotal attachment of the table portion 108 to the tray table assembly 102 allows the table portion 108 to pivot between fully stowed and deployed positions, as well as optionally through intermediate positions. The stowed position may correspond to a generally horizontal and coplanar orientation of the carriage 118, link 120, and table portion 108 under the first rail 114, in which the tray table assembly 102 is disposed along the underside of the alcove 112 to facilitate seat ingress and egress. The deployed positions may correspond to any other position of the tray table assembly 102, in which the table portion 108 is either horizontally and/or vertically offset from the stowed position relative to the first rail 114. Intermediate table portion 108 positions may correspond to any angle less than 180° between the tabletop of the table portion 108 and the link 120. In some embodiments, the tray table assembly 102 may lock in any of the fully stowed, fully deployed and intermediate tray table assembly 102 and/or table portion 108 positions.

FIG. 5A shows a side view of the tray table assembly 102 of FIGS. 1-4B in the hidden, stowed position, with the table portion 108, link 120, and carriage 118 all directly under the first rail 114 and coplanar with each other. As can be seen in the side view of FIG. 5A, the table portion 108 may include a handle 124 and/or side handle 126. The handle 124 and/or side handle 126 may be used to disengage the tray table assembly 102 from the stowed position by lowering the table portion 108 away from the first rail 114, while the carriage 118 maintains a vertically fixed position relative to the first rail 114. Additionally, the handle 124 may include an actuator and/or latching mechanism within the table portion 108 and/or link 120 such that the tray table assembly 102 is locked in the stowed position until the handle 124 is actuated to release the coplanar engagement between the table portion 108 and the link 120. After releasing and/or pulling down on the handle 124 of the table portion 108, the tray table assembly 102 changes from the stowed position to the partially deployed or unlatched position, shown in FIG. 5B.

FIG. 5B shows a side view of the tray table assembly 102 of FIGS. 1-5A in the partially deployed, unlatched position, in which the table portion 108 is vertically displaced or offset from the first rail 114 and the prior coplanar position with the carriage 118 and link 120. The carriage 118, link 120, and table portion 108 may be freely moved horizontally relative to and along the axis of the first rail 114, and the table portion 108 may be vertically raised and/or lowered relative to the first rail 114 and carriage 118 via the pivotal connection to the link 120. In some embodiments, the table portion 108 may maintain the tabletop as facing straight up without any tilt, such that the normal vectors for the tabletop surface and the first rail 114 underside are parallel or at a fixed relative angle. Alternatively, the table portion 108 may be equipped with a tilt mechanism for adjusting the direction that the table top faces. The tilt mechanism may have a number of determinate angles available or may be infinitely adjustable.

Moreover, the table portion 108 may be a bifold table with a first portion and a second portion pivotably connected, such that the table portion 108 may unfold for additional work surface area. This is especially advantageous for small or oddly shaped alcoves, in which the space available for stowing a tray table assembly 102 is limited, but a larger work surface area is desired.

FIG. 5C shows a side view of the tray table assembly 102 of FIGS. 1-5B in the fully deployed or first use position, in which the carriage 118 is extended to the forward end of the first rail 114. As shown, the table portion 108 is lowered into a position vertically offset from the first rail 114 and the carriage 118, but the table portion 108 could also be adjusted to be coplanar with the carriage 118 and link 120. In the vertically offset position, the integrated device backrest 106 of the link 120 can be clearly seen. The vertically offset positions of the table portion 108 thus also serve as varying positions for adjusting the viewing angle or tilt of a personal electronic device 104, book, papers, etc.

Figure 6:
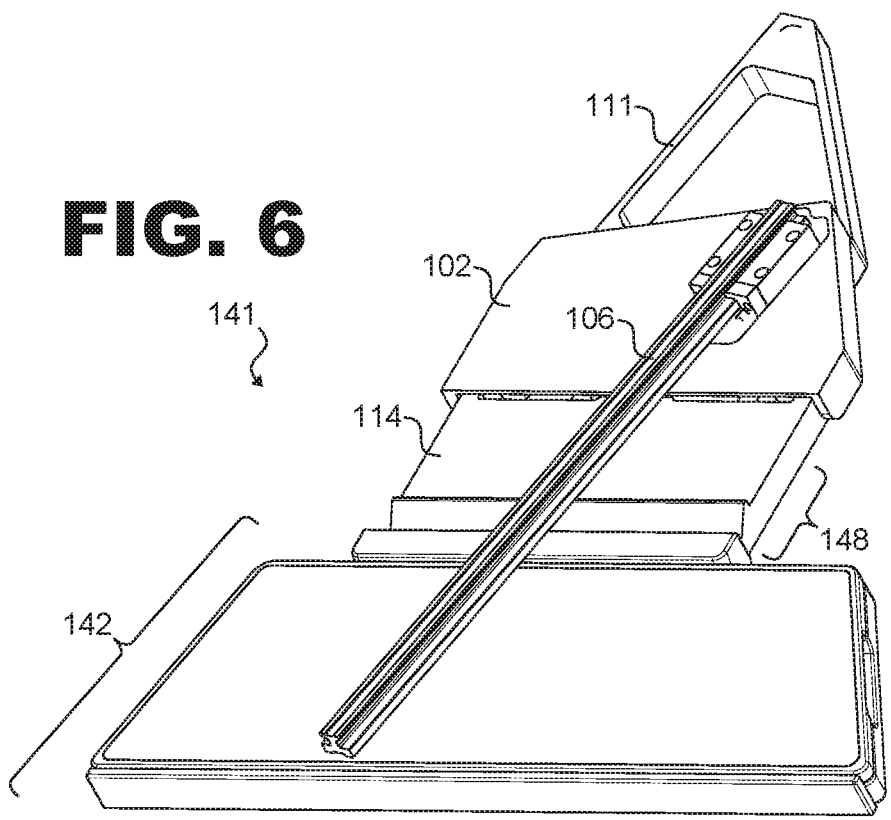
FIG. 6 is an isometric view of another non-limiting example of a tray table assembly shown with an upper mounting rail.

FIG. 6 shows an isometric view of another non-limiting example of a tray table assembly 202 with a single upper mounting rail 214. The tray table assembly 202 of FIG. 6 is shown in a stowed position, in which a table portion 208, link portion 220, and carriage portion 218 are all coplanar and located directly below the upper mounting rail 214, on which the carriage portion 218 glides. The tray table assembly 202 may include a stabilizer 222 fixedly connected to the carriage portion 218. The link portion 220 may include an integrated molding in the shape of a backrest 206. The entire tray table assembly 202 slides back and forth along the upper mounting rail 214 via the carriage portion 218, to which the link portion 220 pivotably connects the table portion 208.

Figure 7:
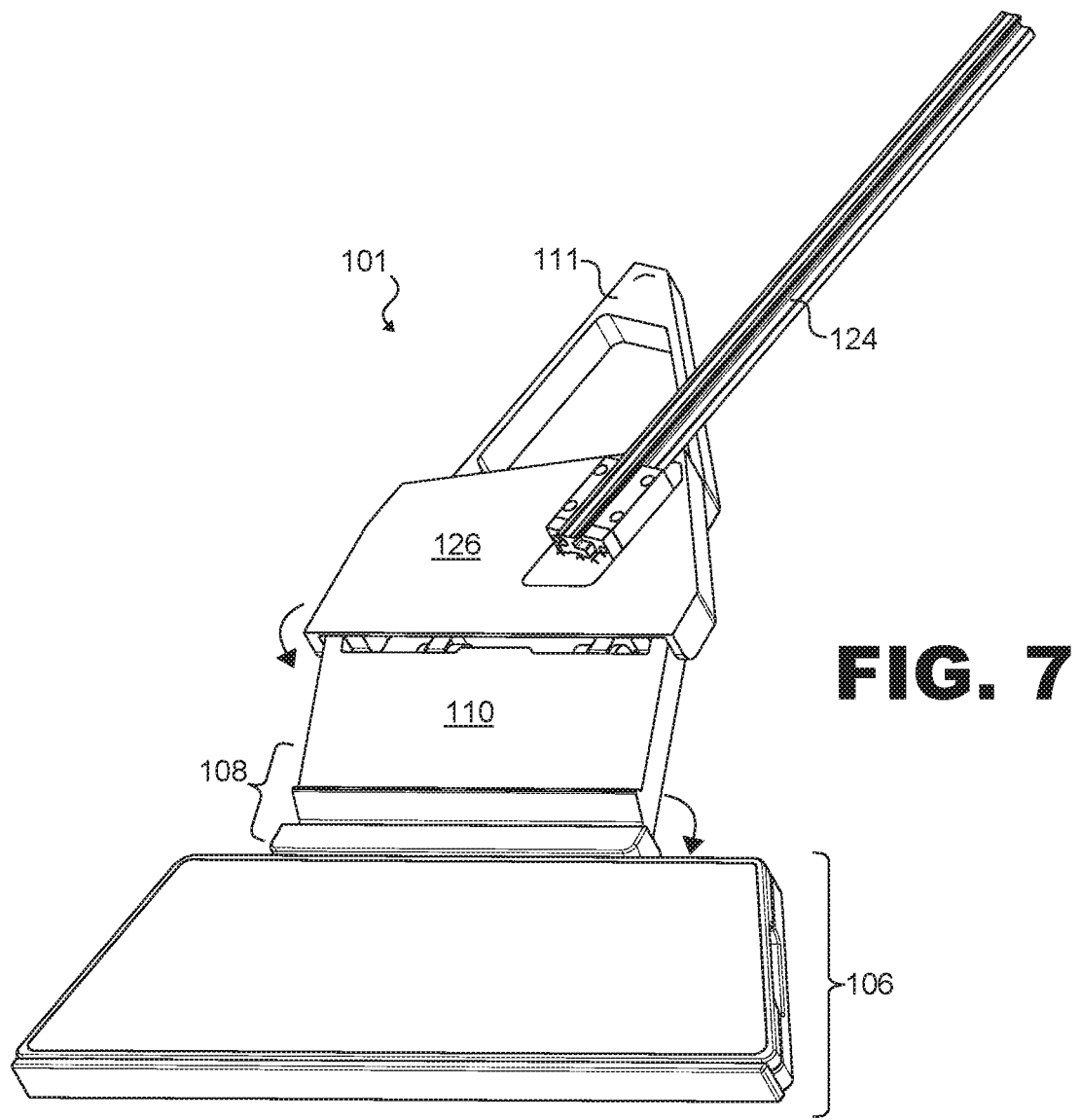
FIG. 7 is an isometric view of the tray table assembly of FIG. 6 shown after sliding along the upper mounting rail via a carriage portion to a deployed position.

FIG. 7 shows an isometric view of the tray table assembly 202 of FIG. 6 after sliding along the upper mounting rail 214 via the carriage portion 218 to a deployed position, in which the carriage portion 218 is extended to the end of the upper mounting rail 214, and the table portion 208 is vertically offset from the upper mounting rail 214 and the carriage portion 218. As can be seen near the backrest 206 of the link portion 220, the table portion 208 forms a non-coplanar angle with the link portion 220. The resulting angle between the carriage portion 218 and the link portion 220 may then be complementary to the angle between the table portion 208 and the link portion 220 to maintain the tilt (or non-tilt) of the table portion 208.

Figure 8:
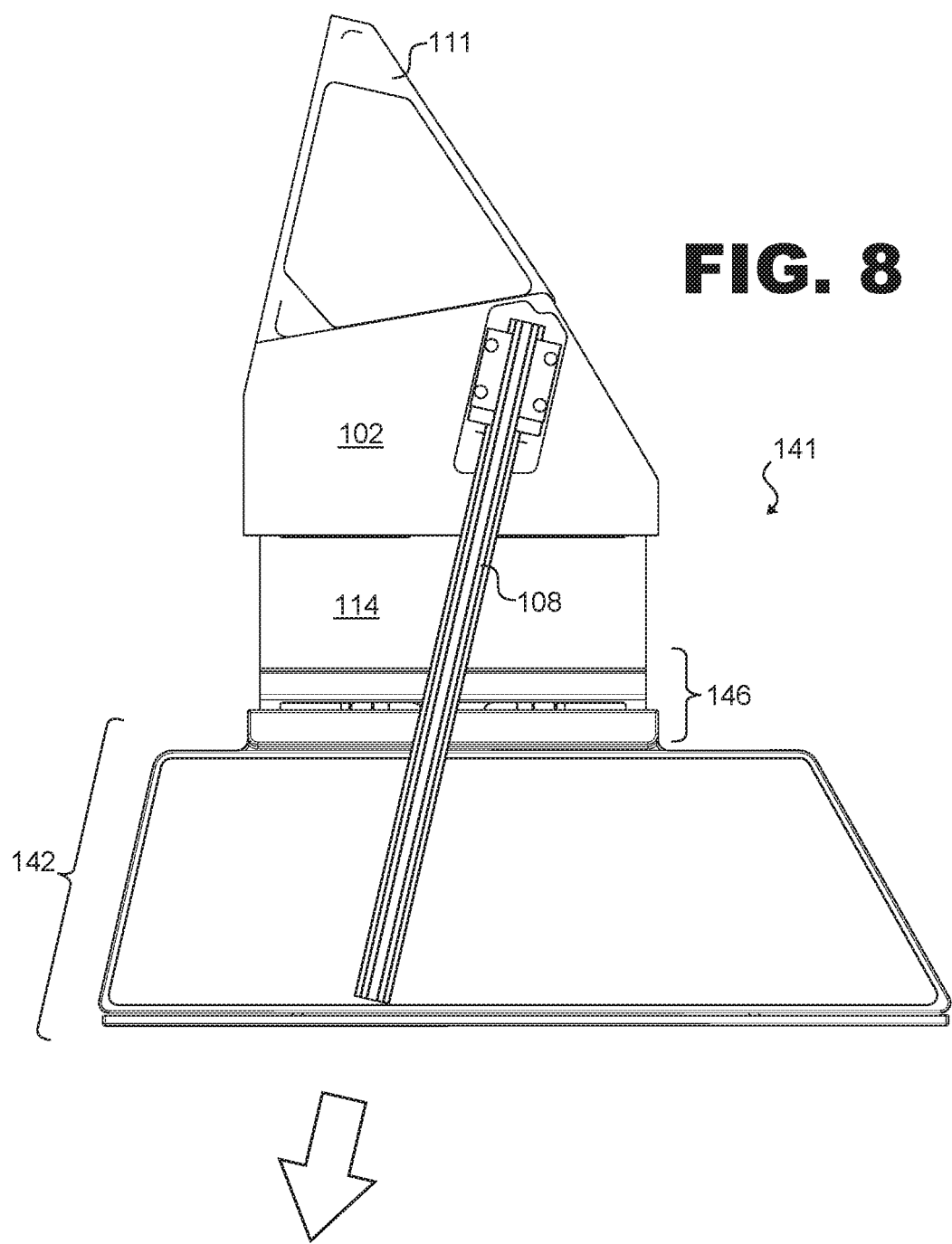
FIG. 8 is top plan view of the tray table assembly of FIGS. 6-7 shown in a stowed position, in accordance with some embodiments of the present disclosure.

FIG. 8 shows a top plan view of the tray table assembly 202 of FIGS. 6-7 in the stowed position, with the carriage portion 218, link portion 220, and table portion 208 coplanar and directly under the upper mounting rail 214. From this view, the path or trajectory of the upper mounting rail 214 (and thus, the tray table assembly 202) is not fully aligned with the tapered or connection angles of the table portion 208, link portion 220, carriage portion 218, and/or stabilizer 222. Therefore, the table portion 208 (and any personal electronic device 104 that may be resting on the backrest 206) may slide at an angle toward the passenger, rather than head-on.

Figure 9:
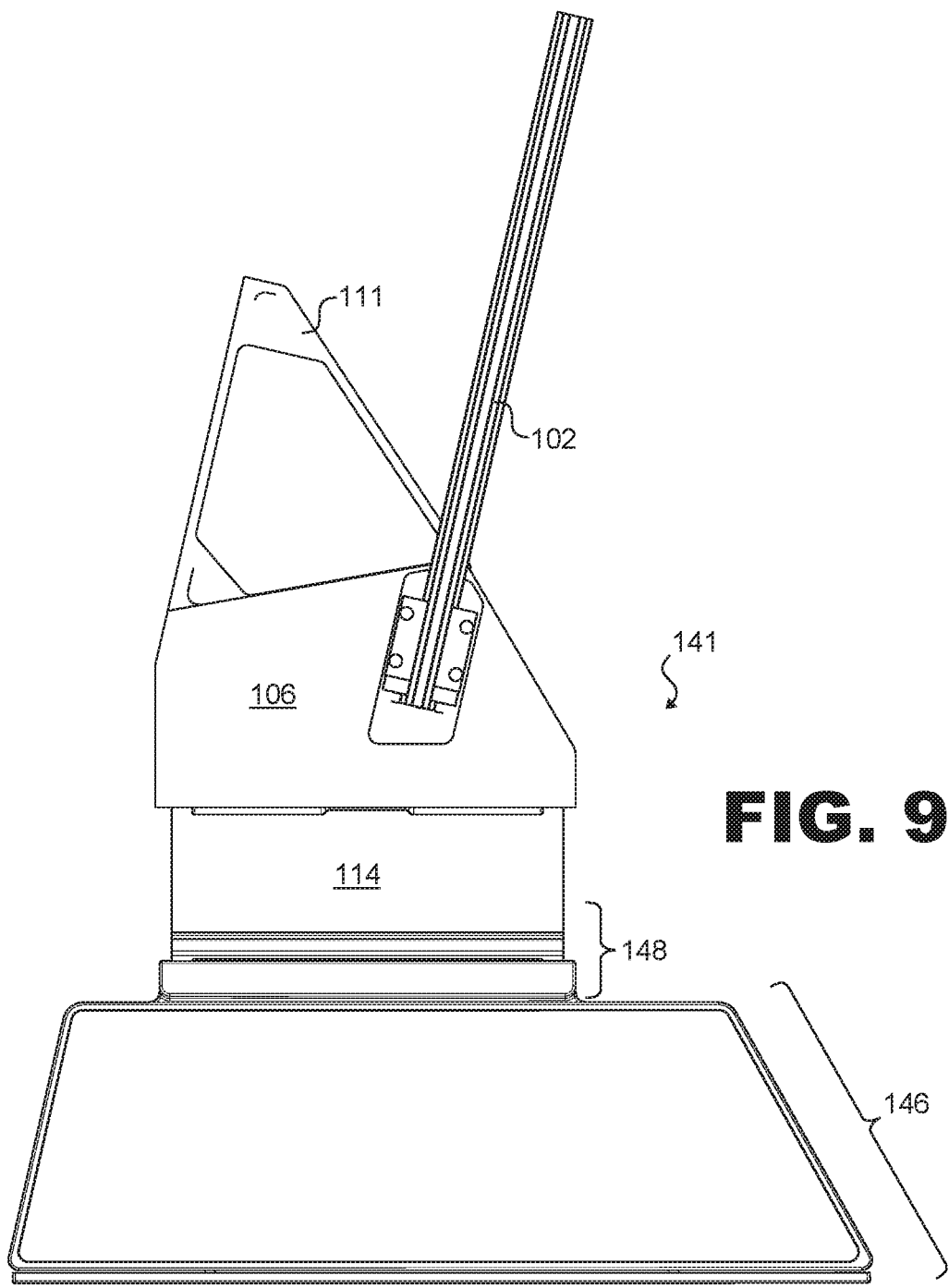
FIG. 9 is a top plan view of the tray table assembly of FIGS. 6-8 shown in a deployed position, in which the carriage portion is coplanar with a tabletop portion.

FIG. 9 shows a top plan view of the tray table assembly 202 of FIGS. 6-8 in the fully deployed or second use position, in which the carriage portion 218 is coplanar with the table portion 208, and the carriage portion 218 is extended to the forward end of the upper mounting rail 214.

Figure 10:
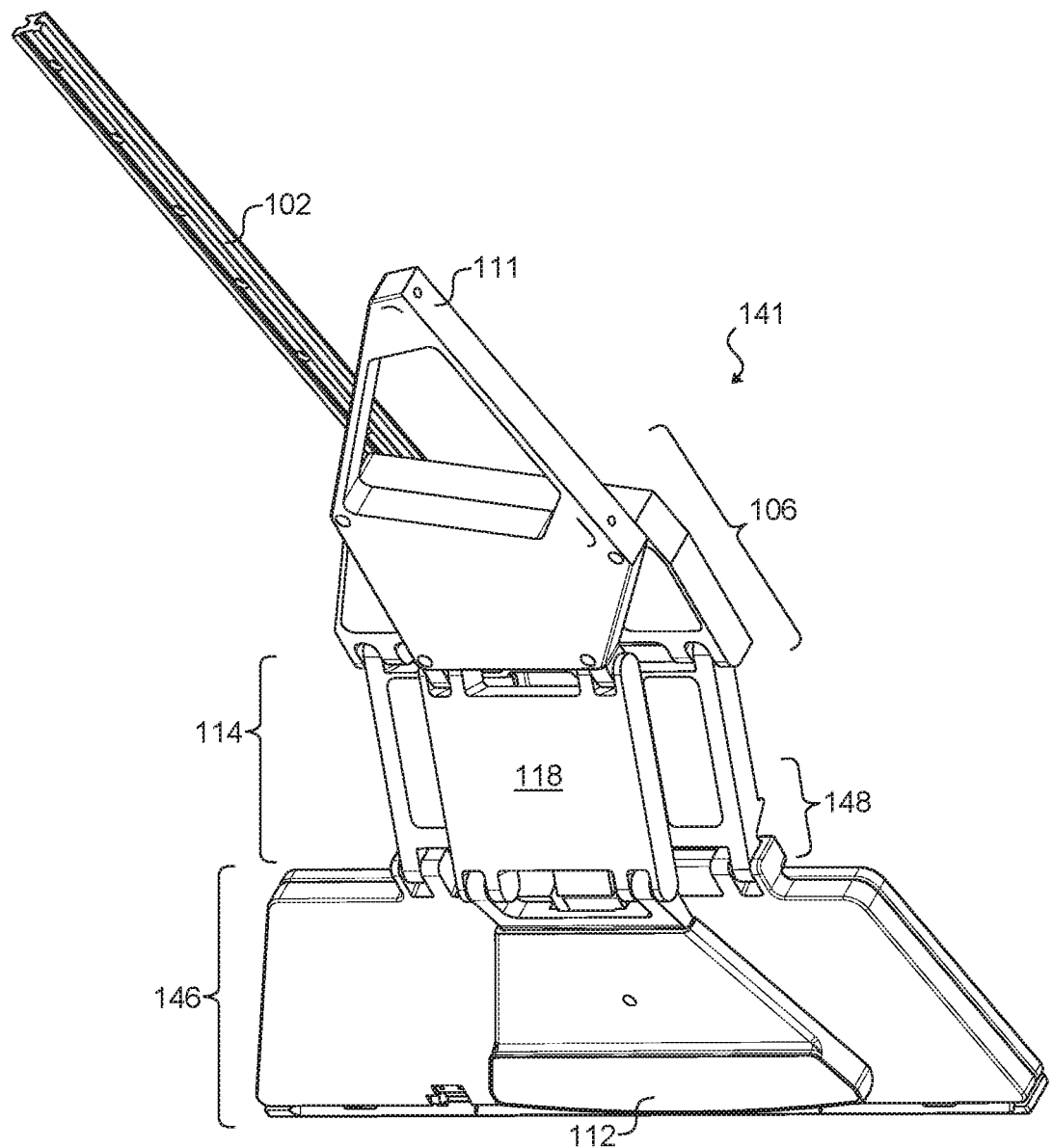
FIG. 10 is an isometric view of the bottom of the tray table assembly of FIGS. 6-9 shown with a handle for commuting the tray table assembly between stowed and deployed positions.

FIG. 10 shows an isometric view of the bottom or underside of the tray table assembly 202 of FIGS. 6-9 in a deployed or first use position, in which the carriage portion 218 extends to the forward end of the upper mounting rail 214, and the table portion 208 is out from directly underneath the upper mounting rail 214 and vertically offset from the carriage portion 218. Further, FIG. 10 shows that the tray table assembly 202 may include a handle 224, connected to and/or underneath the table portion 208, as well as a link support 226, connected to and/or underneath the link portion 220, thereby connecting the stabilizer 222 to the handle 224. The link support 226 may cooperate with the link portion 220 of the tray table assembly 202, wherein the pivotal connections between both the link support 226 and the stabilizer 222 as well as between the link portion 220 and the carriage portion 218 are fixed relative to the upper mounting rail 214. Thus, as the link portion 220 and link support 226 pivot rotationally around the hinge axes at the carriage portion 218 and stabilizer 222, respectively, due to the raising and/or lowering of the table portion 208 relative to the carriage portion 218, the link support 226 may slide with respect to the link portion 220, which may cause the handle 224 to move relative to the table portion 208. The table portion 208, handle 224, link portion 220, and/or link support 226 may include springs within or be otherwise biased to return to any coplanar position. The handle 224 may include a latching mechanism, actuator, and/or other means for commuting the tray table assembly 202 between stowed and deployed positions.

FIG. 11A shows a side elevational view of the tray table assembly 202 of FIGS. 6-10 in the stowed position, in which the carriage portion 218, link portion 220, and table portion 208 are coplanar and directly underneath the upper mounting rail 214. As the handle 224 under the table portion 208 is pulled the carriage portion 218 and link portion 220 are pulled along the path or trajectory of the upper mounting rail 214, and the table portion 208 may be lowered to be vertically offset from the carriage portion 218 as the tray table assembly 202 moves into the deployed or first use position of FIG. 11B.

FIG. 11B shows a side elevational view of the tray table assembly 202 of FIGS. 6-11A in the deployed or first use position, in which the carriage portion 218 is extended to the forward end of the upper mounting rail 214, the table portion 208 is out from directly beneath the upper mounting rail 214 and vertically offset from the carriage portion 218. From this view, the backrest 206 of the link portion 220 for propping up a personal electronic device 104 can be seen, as well as the lateral motion between the upper and lower parts within the table portion 208 and link portion 220.

Figure 12:
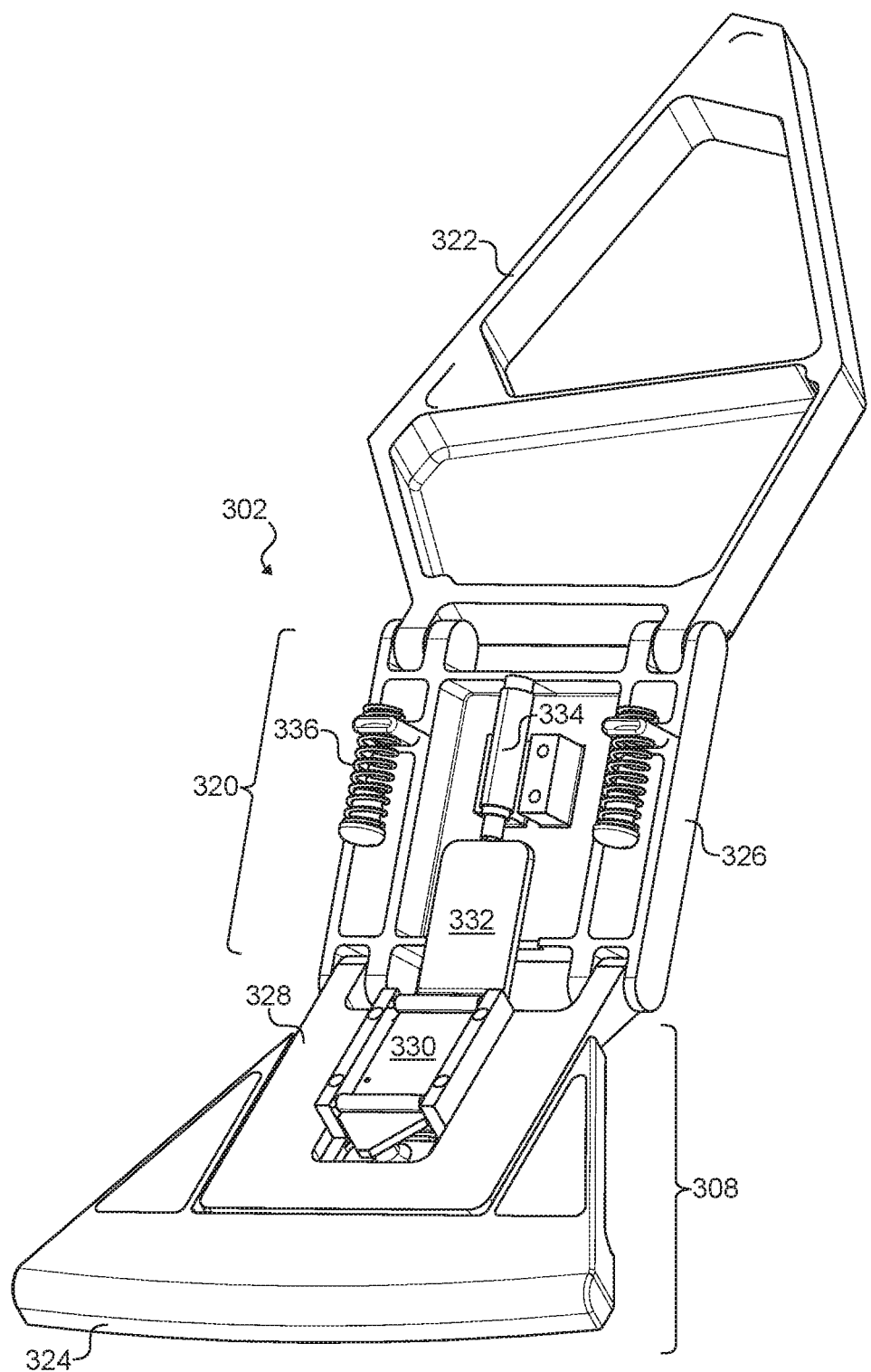
FIG. 12 is an isometric view of a non-limiting example of a lower portion of a tray table assembly including an unlatching handle mechanism for locking and unlocking the tray table assembly into and out of a stowed position, out of the way of a passenger.

FIG. 12 shows an isometric view of a non-limiting example of a lower portion of a tray table assembly 302 including an unlatching handle 324 and mechanisms for locking and unlocking the tray table assembly 302 into and out of a stowed position, hidden and out of the way, in which a table portion 308 and stabilizer 322, connected via a link portion 320, are coplanar and stowed beneath a rail or within an alcove. The tray table assembly 302 of FIG. 12 is shown in a deployed position, in which the table portion 308, link portion 320, and stabilizer 322 are not coplanar, and the table portion 308 is vertically offset from the stabilizer 322. Also shown in FIG. 12 is a handle hinge connector 328 that hingedly connects the unlatching handle 324 to a link support 326 in the link portion 320. The table portion 308 may include a sliding brace 330, which interacts with a sliding bracket 332 within the link portion 320, such that when the sliding brace 330 is interlocked with the sliding bracket 332, the table portion 308 remains coplanar with the link portion 320 and the stabilizer 322. The sliding brace 330 may be biased to become interlocked with the sliding bracket 332 when the table portion 308 is repositioned to be coplanar with the link portion 320. Further, the link portion 320 may include a dampening cylinder 334 for regulating the motion of the table portion 308 and link portion 320 once they are released from the stowed position and/or any other coplanar position. Finally, the link portion 320 may include springs or other biasing mechanism 336 interconnected between the link support 326 and the upper link portion (not shown), such that the biasing mechanism 336 exerts a force on the link support 326 that pulls the link support 326 toward the table portion 308, thus creating a resistance to angling the link support 326 back up toward a coplanar position (and to moving the table portion 308 upward) once the link support 326 has been angled downward—due to the table portion 308 being pulled down to be vertically offset from the stabilizer 322 (i.e., when the tray table assembly 302 is in the partially deployed or unlatched position). Therefore, a user may easily set a vertical height of the table portion 308 in any deployed position without the table portion 308 immediately snapping back to a coplanar configuration. Rather, the user may have to overcome the resistance of the biasing mechanism 336 within the link portion 320 to raise up or vertically move the table portion 308 relative to the stabilizer 322 and/or rail, on which the tray table assembly 302 is disposed.

FIG. 13A is a side elevational view of the lower portion of the tray table assembly 302 of FIG. 12 shown in the latched position, in which the unlatching handle 324, handle hinge connector 328, link support 326, and stabilizer 322 are coplanar, and the sliding bracket 332 is engaged with the sliding brace 330 to prevent the table portion 308 from being lowered relative to the stabilizer 322 and/or to prevent the link portion 320 from being angled less than about 180° with respect to the table portion 308 and/or handle hinge connector 328. To vertically offset or lower the table portion 308 with respect to the stabilizer 322, the user may have to slide the handle hinge connector 328 away from the stabilizer 322 and along the coplanar plane of the stabilizer 322, link support 326, handle hinge connector 328, and unlatching handle 324. This unlatching motion applied to the unlatching handle 324 may cause the sliding brace 330 to slide away from the stabilizer 322, thereby releasing the sliding brace 330 from its interlock with sliding bracket 332 and allowing the tray table assembly 302 to transition to the deployed or unlatched position shown in FIG. 13B.

FIG. 13B is a side elevational view of the lower portion of the tray table assembly 302 of FIGS. 12-13A shown in the deployed or unlatched position, in which the table portion 308 is vertically offset from the stabilizer 322. As can be seen in FIG. 13B, lateral motion of the unlatching handle 324 horizontally away from the stabilizer 322 may cause the sliding brace 330 to slide forward in the same direction as the unlatching handle 324 is pulled. When the sliding brace 330 slides forward, the sliding bracket 332 may become disengaged with the sliding brace 330, allowing the pivotal connection between the handle hinge connector 328 and the link support 326 to rotate about the hinge. Moreover, the bias applied to the sliding bracket 332 may prevent any interlocking between the sliding brace 330 and sliding bracket 332 until the table portion 308 is returned to a coplanar position with the link portion 320. Therefore, after pulling on the unlatching handle 324 and lowering the table portion 308 of the tray table assembly 302, the user does not have to release the unlatching handle 324 in order to adjust the height of the table portion 308 of the tray table assembly 302.

The foregoing description provides embodiments of the inventive concepts by way of example only. It is envisioned that other embodiments may perform similar functions and/or achieve similar results. Any and all such equivalent embodiments and examples are intended to be covered by the appended claims.

What is claimed is:

1. A tray table assembly, comprising:
a rail adapted to be affixed to a monument;
a carriage slidably engaging the rail;
a link pivotably coupled to the carriage at a first end of the link; and
a table hingedly connected to the link at a second end of the link opposite the first end of the link, wherein the table is coupled to a handle for sliding the carriage along the rail, the handle interconnected with the link through a hinged connector including a sliding brace engageable with a sliding bracket contained within the link, the handle actuated to move the sliding brace out of engagement with the sliding bracket to reposition the table relative to the link, and the sliding brace biased toward an engaged position with the sliding bracket;
wherein the table is configured to deploy:
from a stowed position in which the table is directly below and adjacent the rail and coplanar with the carriage;
to an unlatched position in which the table is below and apart from the rail and at a lower elevation than the carriage;
to a first use position in which the table is forward of the rail and at a lower elevation than the carriage; and
to a second use position in which the table is forward of the rail and coplanar with the carriage.

2. The tray table assembly of claim 1, further comprising a second rail adapted to be affixed to the monument, and a stabilizer coupled to the carriage and slidably engaging the second rail.

3. The tray table assembly of claim 1, wherein the link comprises an integral backrest adapted to position a personal electronic device supported thereon at a predetermined angle.

4. The tray table assembly of claim 1, wherein the table is a bifold table comprising first and second pivotably connected portions.

5. The tray table assembly of claim 1, wherein the handle comprises a latching mechanism, that when latched, prevents the tray table assembly from deploying out of the stowed position.

6. The tray table assembly of claim 1, wherein the table comprises an integrated side handle.

7. An aircraft passenger seat arrangement, comprising:
a passenger seat;
an alcove positioned directly forward of the passenger seat, the alcove covered by a static structure; and
a tray table assembly disposed within the alcove and affixed to the static structure, the tray table assembly comprising:
a rail affixed to an underside of the static structure;
a carriage slidably engaging the rail;
a link pivotably coupled to the carriage at a first end of the link distal from the passenger seat, and
a table hingedly connected to a second end of the link proximate the seat, wherein the table is coupled to a handle for sliding the carriage along the rail, the handle interconnected with the link through a hinged connector including a sliding brace engageable with a sliding bracket contained within the link, the handle actuated to move the sliding brace out of engagement with the sliding bracket to reposition the table relative to the link, and the sliding brace biased toward an engaged position with the sliding bracket;
wherein the table is configured to deploy:
from a stowed position in which the table is directly below and adjacent the rail and coplanar with the carriage;
to an unlatched position in which the table is below and apart from the rail and at a lower elevation than the carriage;
to a first use position in which the table is forward of the rail and at a lower elevation than the carriage; and
to a second use position in which the table is forward of the rail and coplanar with the carriage.

8. The aircraft passenger seat arrangement of claim 7, wherein the tray table assembly further comprises a second rail affixed to the static structure, and a stabilizer coupled to the carriage and slidably engaging the second rail.

9. The aircraft passenger seat arrangement of claim 7, wherein the link of the tray table assembly comprises an integral backrest adapted to position a personal electronic device supported thereon at a predetermined angle.

10. The aircraft passenger seat arrangement of claim 7, wherein the table is a bifold table comprising first and second pivotably connected portions.

11. The aircraft passenger seat arrangement of claim 7, wherein the handle comprises a latching mechanism, that when latched, prevents the tray table assembly from deploying out of the stowed position.

12. The aircraft passenger seat arrangement of claim 7, wherein the table comprises an integrated side handle.

* * * * *